United States Patent Office 3,554,901
Patented Jan. 12, 1971

3,554,901
AROMATIZATION WITH A CHROMIUM-PLATINUM PALLADIUM CATALYST
Naoya Kominami and Toshiyuki Iwaisako, Tokyo, and Kyugo Tanaka and Kusuo Ohki, Saitama-ken, Japan, assignors to Asahi Kasei Kogyo Kabushiki Kaisha, Osaka, Japan
No Drawing. Filed May 1, 1969, Ser. No. 821,094
Claims priority, application Japan, May 10, 1968, 43/30,875, 43/30,876
Int. Cl. G10g 35/08
U.S. Cl. 208—136        5 Claims

ABSTRACT OF THE DISCLOSURE

Process for producing aromatic hydrocarbons by bringing a mixture of hydrogen and hydrocarbons into contact with a catalyst at a temperature of from 400° C. to 650° C., characterized in that said catalyst is prepared by impregnating a carrier with a solution containing three components of 0.1–1.0% by weight of platinum calculated as metal, 0.1–1.0% by weight of palladium calculated as metal and 5–25% by weight of chromium oxide and treating the resulting impregnated carrier with hydrogen.

BACKGROUND OF THE INVENTION (1) Field of the invention

This invention relates to a process for producing products containing aromatic hydrocarbons in high concentration in high yields by bringing hydrocarbons into contact with a catalyst.

(2) Description of the prior art

There have been made many studies heretofore with regard to reforming reactions of hydrocarbons in which hydrocarbons are treated with a catalyst to enhance the octane values, and a number of processes have been exploited on a commercial scale, developing the technique into an important branch of petrochemical industry.

Basically, the reforming reaction mainly involves such reactions as hydrogenation, dehydrogenation, isomerization, cyclization-dehydrogenation, etc. which proceed concurrently and successively to yield a high-octane fraction.

There have been proposed many industrial processes in which platinum, chromia, molybdena or cobalt-molybdena supported on alumina, bauxite, etc. is employed as a catalyst and the reaction is carried out under hydrogen pressure.

In recent years, demands for aromatic compounds are becoming larger and larger, and in order to meet this growing tendency, there have been proposed various processes for the production of aromatic compounds from petroleum fractions, i.e. production of benzene, toluene, xylene and the like mainly from cracked gasoline and reformate by extraction or dealkylation thereof.

However, from commercial point of view, since composition and supply of cracked gasoline rely upon ethylene production processes and plants, only a part of the demands can be satisfied and the production of aromatic compounds by reforming becomes necessary to fulfill unappeased demands.

However, because of the fact that the reformate obtained by reforming process has low concentrations of aromatic compounds, the production of benzene, toluene, xylene and the like therefrom by extraction or dealkylation has an economical disadvantage.

SUMMARY OF THE INVENTION

An object of this invention is to provide a process for producing aromatic compounds in high yields from petroleum fractions having high contents of non-aromatic compounds by a catalytic reaction, free from the disadvantages of the prior art mentioned above.

In accordance with this invention, the object mentioned above can be accomplished by a process for producing aromatic compounds which comprises bringing a mixture of hydrogen and hydrocarbons into contact at a temperature ranging from 400 to 650° C. with a catalyst prepared by impregnating a carrier with a solution containing three components, viz. 0.1–1.0% by weight of metallic platinum, 0.1–1.0% by weight of metallic palladium and 5–25% by weight of chromium oxide, and treating the resulting impregnated carrier with hydrogen.

In the present invention, compounds of platinum and palladium which can be converted into metallic platinum and palladium under the reaction conditions of the present invention may also be used as the catalyst components.

Examples of usable platinum compounds include $PtCl_2$, $P_2tHCl_4$, $PtCl_4$, $PtCl_4 \cdot 8H_2O$, $H_2PtCl_6 \cdot nH_2O$, $(NH_4)_2PtCl_6$ and $Pt(OH)_2$, and those of usable palladium compounds include $PdCl_2$, $PdCl_2 \cdot 2H_2O$, $Pd[(NH_3)_4]Cl_2 \cdot H_2O$, $$(NH_4)_2PdCl_4$$

and $Pd(OH)_2$.

It is also possible to impregnate a carrier with a solution prepared by dissolving metallic platinum or palladium, or oxides thereof, into hydrochloric acid, nitric acid or aqua regia.

In any event, these compounds and solutions give metallic platinum or palladium under the reaction conditions of the present invention which involve the presence of hydrogen.

In preparing the chromium oxide, $CrO_3$, $NH_4Cr_2O_7$ and $Cr(NO_3)_3 \cdot 9H_2O$ are preferably used.

The amount of metallic platinum or metallic palladium to be supported on a carrier most preferbaly ranges from 0.1 to 1.0% by weight. The amount of chromium oxide to be supported on a carrier ranges from 5 to 25% by weight, and most preferably 10–20% by weight, calculated as $Cr_2O_3$.

As described above, the catalyst used in the present invention is obtained by impregnating a carrier with a solution containing three components consisting of a platinum component, a palladium component and chromium oxide, heating the impregnated carrier thus obtained to be dried and treating thus dried carrier in hydrogen atmosphere at a temperature ranging 400–600° C.

While carriers such as silica, alumina and silica-alumina which are conventionally used for supporting catalysts may be conveniently used in the present invention, in particular, alumina is most effectively used.

In preparing the alumina, aluminum hydroxides of the general formula $A10_x(OH)_y$, wherein $x$ and $y$ are integers not less than 1, inclusive; gypsite $Al_2O_3 \cdot 3H_2O$; diaspore, böhmite $Al_2O_3 \cdot H_2O$; or $\alpha$-, $\gamma$-, $\theta$- and $\eta$-type alumina of the general formula $Al_2O_3$ are preferably used as the starting material. All these compounds referred to above are gradually and eventually turned into an alumina of a specific type under the reaction conditions of the present invention. Thus, any natural minerals containing these compounds, e.g. bauxite, may also be used.

In order to stabilize the catalyst, the catalyst after being supported on a carrier, may be calcined in air for thirty minutes to five hours at a temperature of 400–550° C. However, this is not an essential requisite in the present invention because the catalyst is gradually stabilized with the passage of reaction time anyhow. Nevertheless, it is essential for activating the catalyst to treat the same at a temperature of from 400 to 600° C. under a hydrogen stream for thirty minutes to 10 hours prior to the reaction.

The reaction conditions of the process of the present invention include a reaction temperature of from 400 to 650° C. (750° F.–1200° F.); a molar ratio of hydrogen to hydrocarbons of 1.0–10; a liquid hourly space velocity of 0.2–5.0; and a reaction pressure of 1–30 kg./cm.$^2$.

Hydrocarbons used in the present invention are those having not less than 6 carbon atoms such as petroleum naphtha, kerosene and the like inclusive of mixtures thereof; paraffins, olefins, naphthenes or aromatics or mixtures of two or more kinds thereof.

As described above, the process of the present invention is characterized by the use of a novel and specific catalyst and it has advantages over the prior art processes in the following respects:

Firstly, the yields of aromatic compounds obtained according to the present invention are high. In general, the yields of aromatic compounds by reforming of petroleum naphtha containing not less than 70% of paraffins range from 40 to 50% by weight based on the weight of naphtha, at the highest. In contradistinction, in accordance with the present invention, the yields are higher than 60% by weight on the same basis.

Secondly, the concentration of aromatic compounds in the resulting liquid is so high that there is obtained a liquid substantially comprising aromatic compounds alone. It is particularly significant from a commercial standpoint that this second advantage can be accomplished together with the first advantage mentioned above. In the prior art processes known heretofore, an attempt to obtain a fraction having a high concentration of aromatic compounds inevitably leads to decrease in the liquid yield. Thus, it has been almost impossible to obtain a product having a high concentration in a high yield.

Thirdly, according to the present invention, there is obtained a product having a composition of aromatic compounds contained therein which is completely different from those of products obtained in the prior art processes. To wit, in the conventional reforming processes practised nowadays, the compositions of aromatic compounds in the products include large amounts of aromatics having not less than 9 carbon atoms, in addition to benzene, toluene and xylene.

However, in the process of this invention, it is possible to obtain a product liquid substantially comprising benzene, toluene and xylene, or, by suitably varying the reaction conditions, benzene alone. Heretofore, in producing benzene, solvent extraction or dealkylation of reformate or cracked gasoline has been adopted, and in the production of toluene and xylene, there has been employed solvent extraction of the same material.

In contradistinction, in accordance with the present invention, there can be produced from the starting material such as naphtha, benzene in a one-step chemical process, or a mixture of benzene, toluene and xylene by varying the reaction conditions and, if desired, the respective components may be separated from each other by a simple distillation, without requiring any complicated processes such as separation by extraction or dealkylation.

The great advantages of the present invention brought about as described above stem from the catalyst prepared according to the impregnation method.

It is, of course, possible in the present invention to obtain a product liquid having a composition similar to those of product liquids obtained according to the prior art processes, or a gasoline having an octane value about equal to those of gasolines of the prior processes, by lowering the reaction temperature and increasing the liquid hourly space velocity as compared with those in known processes.

Fourthly, in the catalyst of the present invention the decrease in catalyst activity due to deposition of carbonaceous materials is quite minimal and a stable reaction can be carried out even under low pressures without requiring the regeneration of the catalyst.

DESCRIPTION OF THE PREFERRED EMBODIMENTS

The present invention will be explained more in detail in the following examples.

Example 1

To 200 ml. of an aqueous solution containing 24.6 g. of chromium oxide were added 25.6 ml. of an aqueous solution containing 0.1 mol/l. of chloroplatinic acid $H_2PtCl_6 \cdot 6H_2O$ and 23.4 ml. of an aqueous solution containing 0.2 mol/l. of palladium chloride $PdCl_2 \cdot 2H_2O$ and 0.05 mol/l. of HCl and the resulting mixture was heated on water bath, then, poured to 100 g. of γ-alumina pelletized in 2–3 mm. diameters followed by evaporating to dryness.

The resulting catalyst had a composition including 0.5% by weight of platinum, 0.5% by weight of palladium, both calculated as metals, 10% by weight of chromium oxide and 89% by weight of alumina. After 50 cc. of the catalyst thus obtained were heated at 580° C. for an hour in the presence of hydrogen, there was passed a gaseous mixture consisting of hydrogen and naphtha having the composition as referred to hereinafter in a volume ratio of 1:2.8 through a catalyst layer maintained at 580° C. under atmospheric pressure at a liquid hourly space velocity of 0.2 hr.$^{-1}$.

The reaction product consisted of 40.9% of a gaseous product mainly composed of methane and 59.1% of a liquid product having a composition as shown in the following.

Result of the reaction remained unchanged after the continuous operation for 15 hours.

Composition of starting naphtha [1]

| Ingredient: | Vol. percent |
|---|---|
| Paraffin | 70.5 |
| Olefin | 0.0 |
| Naphthene | 20.3 |
| Aromatics | 9.2 |

[1] B.P. 65–185° C. specific gravity 0.753 (20° C.).

Composition of liquid reaction product

| Ingredient | Wt. percent |
|---|---|
| Benzene | 91.4 |
| Naphthalene | 7.3 |
| Other aromatics | 1.3 |
| Total aromatics | 100.0 |

Comparative Example 1.—The reaction was carried out under the same conditions as described in Example 1 except that conventionally known catalysts having a composition as shown below and reaction periods specified below were used. The results are summarized in the following:

| Catalyst composition | Liquid yield (wt. percent) | Composition of liquid reaction product (wt. percent) | | | | |
|---|---|---|---|---|---|---|
| | | Benzene | Toluene | Xylene | $C_9^+$ aromatics | Others * |
| Pt (0.5 wt. percent)<br>$Cr_2O_3$ (10 wt. percent)<br>$Al_2O_3$ (89.5 wt. percent) | 54.5 | 6.6 | 29.8 | 19.0 | 4.3 | 40.0 |
| Pt (0.5 wt. percent)<br>Ni (0.5 wt. percent)<br>$Cr_2O_3$ (10 wt. percent)<br>$Al_2O_3$ (89 wt. percent) | 40.7 | 1.2 | 8.0 | 23.7 | 5.1 | 62.0 |

* Mostly i-, and n-paraffins.

Example 2

A catalyst was prepared according to the same procedures as described in Example 1 except that $H_2PtCl_4$, $PdCl_2$ and alumina gel were used as the starting materials, respectively.

The resulting catalyst contained 0.5% by weight of metallic platinum, 0.2% by weight of metallic palladium and 20% by weight of chromia.

After 10 cc. of the catalyst thus obtained were heated at 500° C. for an hour in the presence of hydrogen, there was passed a gaseous mixture consisting of hydrogen and n-heptane in a molar ratio of 5:1 through a catalyst layer maintained at 550° C. under atmospheric pressure at a liquid hourly space velocity of 0.5 hr.$^{-1}$.

The reaction product consisted of 39.8% of a gaseous product mainly composed of methane and 60.2% of a liquid product having a composition as shown in the following. Result of the reaction remained unchanged after the continuous operation for 20 hours.

Composition of liquid reaction product

| Ingredient: | Wt. percent |
| --- | --- |
| Benzene | 93.1 |
| Toluene | 1.3 |
| $C_9{}^+$ Aromatics [1] | 2.6 |
| Naphthalene | 3.0 |
| Total aromatics | 100.0 |

[1] Aromatics having not less than 9 carbon atoms.

Comparative Example 2.—The reaction of Example 2 was carried out under the same conditions as set forth therein except that a known catalyst consisting of 0.5% by weight of platinum and 99.5% by weight of γ-alumina was used and the reaction period was 2 hours. (The reaction had to be curtailed in 2 hours due to drastic degradation in the catalyst activity.)

The reaction product consisted of 52.3% of a gaseous product mainly composed of paraffins and olefins having 1–4 carbon atoms and 47.7% of a liquid product of the following composition:

Composition of liquid reaction product

| Ingredient: | Wt. percent |
| --- | --- |
| Benzene | 0.9 |
| Toluene | 51.2 |
| Xylene | 2.1 |
| $C_9{}^+$ Aromatics [1] | 3.2 |
| Total aromatics | 57.4 |
| Others [2] | 42.6 |

[1] Aromatics having not less than 9 carbons.
[2] Mainly consisting of n-, or i-paraffins and unreacted heptane.

Example 3

A catalyst was prepared according to the same procedures as described in Example 1 except that $PtCl_2$, $Pd(OH)_2$ and gypsite were used as the starting materials, respectively.

The resulting catalyst contained 0.5% by weight of metallic platinum, 0.5% by weight of metallic palladium and 10% by weight of chromia.

After 100 cc. of the catalyst thus obtained were treated at 530° C. for 2 hours in the presence of hydrogen, there was passed a gaseous mixture consisting of hydrogen and naphtha in a volume ratio of 1:3 through a catalyst layer maintained at 530° C. under a total reaction of 14 kg./cm.$^2$ at a liquid hourly space velocity of 2.0 hr.$^{-1}$.

The reaction product consisted of 25.6% of a gaseous product and 74.4% of a liquid product of the following composition:

Composition of liquid reaction product

| Ingredient: | Wt. percent |
| --- | --- |
| Benzene | 17.7 |
| Toluene | 20.8 |
| Xylene | 28.1 |
| $C_9{}^+$ Aromatics [1] | 21.6 |
| Total aromatics | 88.2 |

[1] Aromatics having not less than 9 carbons.

Results of the reaction remain unchanged after the continuous operation for 46 hours.

Comparative Example 3.—The reaction of Example 3 was carried out under the same conditions as described therein except that a known catalyst consisting of 0.5% platinum and 99.5% γ-alumina was used and the reaction period was 3 hours.

The reaction product consisted of 27.0% of a gaseous product mainly composed of paraffins and olefins having 1–4 carbon atoms, and 73.0% of a liquid product of the following composition:

Composition of liquid reaction product

| Ingredient: | Wt. percent |
| --- | --- |
| Benzene | 2.2 |
| Toluene | 12.4 |
| Xylene | 18.7 |
| $C_9{}^+$ Aromatics [1] | 15.1 |
| Total aromatics | 48.4 |

[1] Aromatics having not less than 9 carbons.

Example 4

A catalyst was prepared according to the same procedures as described in Example 1 except that $$H_2PtCl_6 \cdot 6H_2O, \; PdCl_2 \cdot 2H_2O \; \text{and} \; \theta - Al_2O_3$$

were used as the starting material, respectively. The resulting catalyst contained 0.5% by weight of metallic platinum, 0.5% by weight of metallic palladium, 10% by weight of chromia and 89% by weight of θ-alumina.

The reaction was carried out by employing 150 cc. of the catalyst thus obtained and a gaseous mixture consisting of hydrogen and naphtha having the same composition as that used in Example 1 in a volume ratio of 1:3 under reaction conditions including a catalyst layer temperature of 500° C., a liquid hourly space velocity of 0.5 hr.$^{-1}$ and a reaction pressure of atmospheric pressure.

There was obtained a reaction product consisting of 12.8% of a gaseous product and 87.2% of a liquid product indicating a research octane number (hereinafter referred to as "R.O.N.") of 113.

The R.O.N. remained unchanged after the continuous operation of the reaction for 40 hours.

Comparative Example 4.—The reaction of Example 4 was carried out according to the same procedures as described therein except that a known catalyst consisting of 0.5% by weight of platinum, 0.5% by weight of palladium, 10% by weight of boria and 89% by weight of γ-alumina, was used.

There was obtained a reaction product consisting of 16.3% of a gaseous product and 83.7% of a liquid product showing a R.O.N. of 83.

The R.O.N. dropped to 72 after the reaction was carried on for 20 hours.

Comparative Example 5.—The reaction of Example 1 was carried out according to the same procedures as described therein except that a catalyst prepared by mixing 1,000 cc. of an alumina sol having properties as shown below, instead of γ-alumina, and a solution of catalytic components to cogellate, was used.

The reaction product consisted of 37.7% of a gaseous product mainly comprised of methane, ethane, propane and butane and 62.3% of a liquid product of the following composition:

Composition of liquid reaction product

| Ingredient: | Wt. percent |
|---|---|
| Benzene | 4.3 |
| Toluene | 14.4 |
| Xylene | 23.7 |
| $C_9^+$ Aromatics [1] | 20.8 |
| Total aromatics | 63.2 |

[1] Aromatics having not less than 9 carbons.

Properties of alumina sol $Al_2O_3$ content: 10 wt. percent
PH at 20° C.: 4-6
Density at 20° C.: 1.09–1.14
Viscosity at 20° C.: 250 cps.
Particle size: 100μ in length; 10μ in diameter

What is claimed is:

1. Process for producing aromatic hydrocarbons by bringing a mixture of hydrogen and hydrocarbons into contact with a catalyst at a temperature of from 400° C. to 650° C., characterized in that said catalyst is prepared by impregnating a carrier with a solution containing three components of 0.1–1.0% by weight of platinum calculated as metal, 0.1–1.0% by weight of palladium calculated as metal and 5–25% by weight of chromium oxide and treating the resulting impregnated carrier with hydrogen.

2. Process according to claim 1 wherein said carrier is selected from the group consisting of silica, alumina and silica-alumina.

3. Process according to claim 1 wherein said platinum component is a member selected from the group consisting of metallic platinum, $PtCl_2$, $H_2PtCl_4$, $PtCl_4$, $PtCl_4 \cdot 8H_2O$, $H_2PtCl_6 \cdot nH_2O$, $(NH_4)_2PtCl_6$ and $Pt(OH)_2$.

4. Process according to claim 1 wherein said palladium component is a member selected from the group consisting of metallic palladium, $PdCl_2$, $PdCl_2 \cdot 2H_2O$, $Pd[(NH_3)_4]Cl_2 \cdot H_2O$, $(NH_4)_2PdCl_4$ and $Pd(OH)_2$.

5. Process according to claim 1 wherein said treatment of the catalyst with hydrogen is carried out at a temperature ranging 400–600° C.

References Cited

UNITED STATES PATENTS

| 2,870,084 | 1/1959 | Strecker et al. | 208—136 |
| 2,897,135 | 7/1959 | Doumani | 208—138 |
| 3,002,036 | 9/1961 | Hieronymus | 260—673.5 |
| 3,193,349 | 7/1965 | Mooi | 208—138 |

HERBERT LEVINE, Primary Examiner

U.S. Cl. X.R.

208—138; 252—470; 260—673.5